United States Patent Office 3,219,504
Patented Nov. 23, 1965

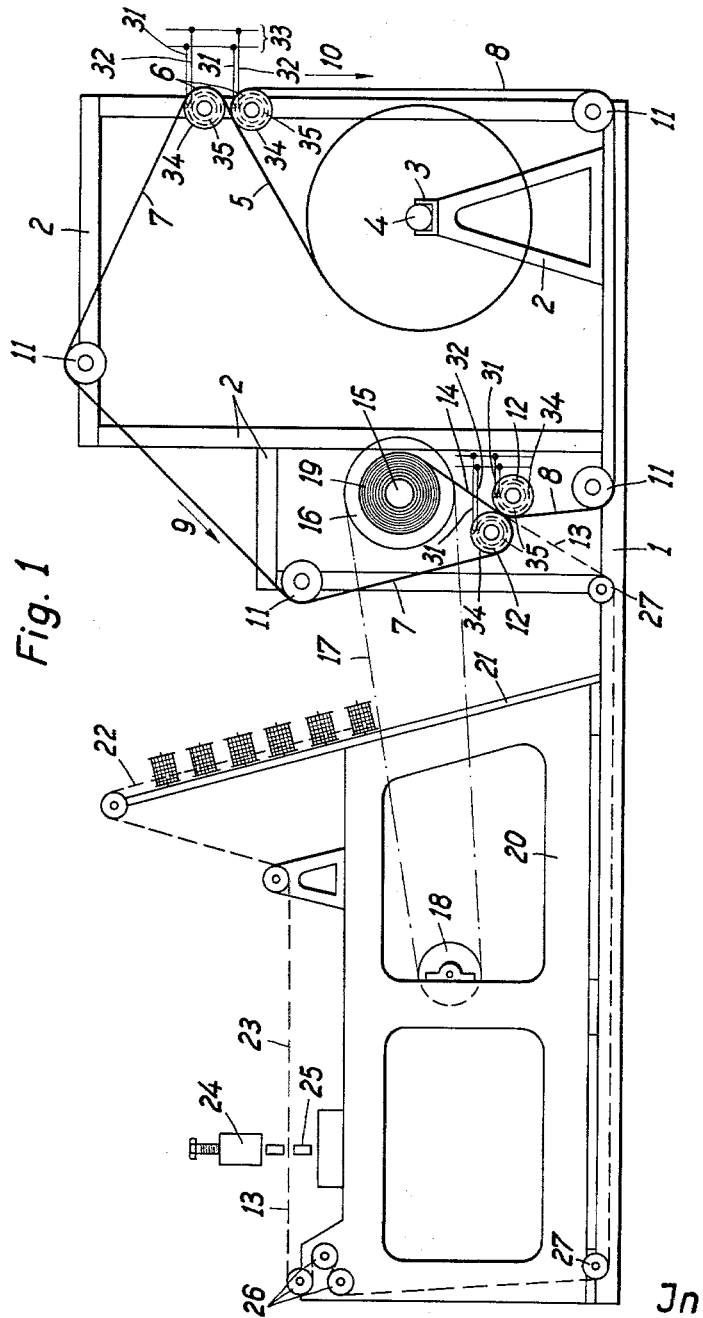

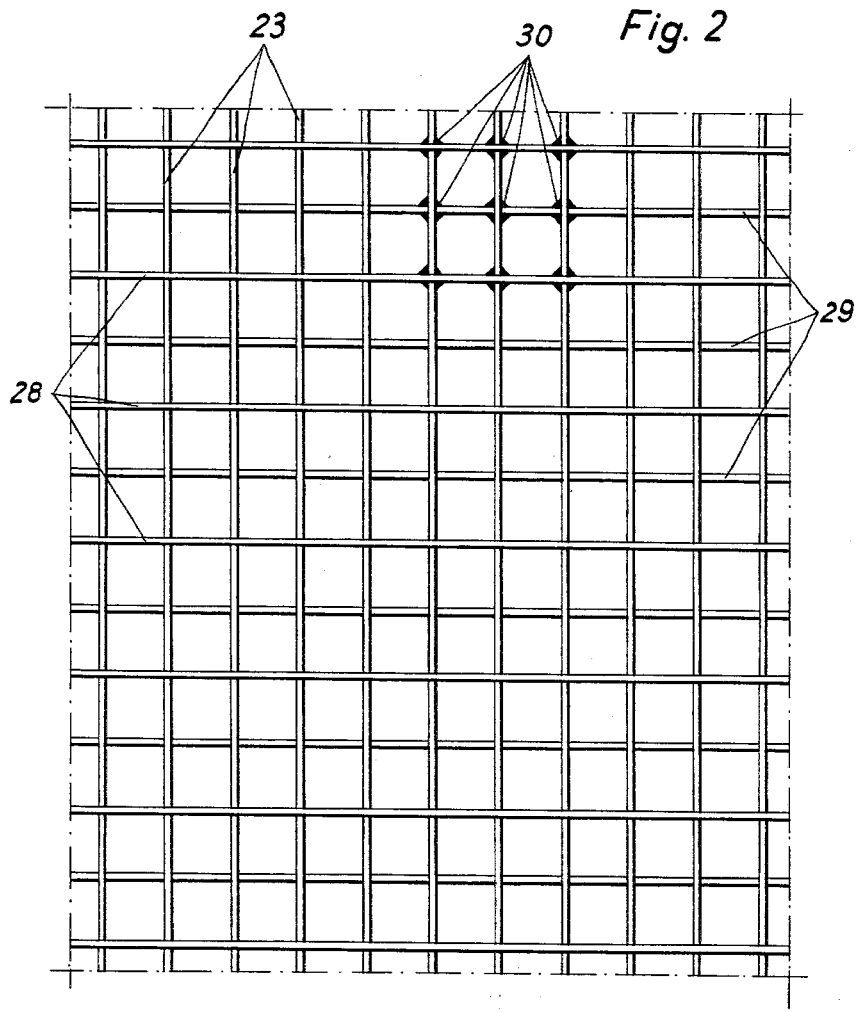

3,219,504
METHOD AND APPARATUS FOR MAKING A COMPOSITE REINFORCED WEB
Walter Rosler, Opmunderweg 14, Soest, Germany
Filed Dec. 14, 1959, Ser. No. 859,538
17 Claims. (Cl. 156—152)

The present invention relates to methods and apparatus for preparing webs or sheets which are adhesively connected by sealable binders such as bitumens, heat sealers or the like and reinforced with tension-resisting inserts of paper, board, textiles, plastic or the like the tension-resisting inserts consisting e.g., also of textiles or of plastics, metals, mainly metal wire structures such as woven wire, braided wire, wire nets or the like. In this connection the term wire net refers to crossing sets of wire which lie on one side of each other and are welded, soldered or bonded by other methods at the crossing points and which may be galvanized. The term woven wire does not only refer to wire structures without metallic joints and having a weave similar to the textile weave but also to structures which have in addition to such weave a metallic bond produced, e.g., by a subsequent galvanizing, welding or soldering of the crossing points.

The manufacture of such webs or sheets involves considerable difficulties because economic reasons compel the use of increasing processing speeds and web widths. The fact that web widths of several meters were adopted in some cases has led to extremely large machine units comprising heated reservoirs for the binder, as well as cooling drums. These measures are no longer suitable for the introduction of the tension-resisting inserts, particularly if a non-textile material is used. E.g., if the reinforcing insert consists of a wire structure it must be supplied from the wire manufacturer to the paper processing plant. Wire nets used as inserts are supplied in lengths of 300 meters. This is effected in a rolled up condition. The rolls are stacked one upon the other in transit. The inevitable impacts occurring in transit cause the rolls to be flattened so that dislocations occur which have the result that the insert runs in obliquely during the processing of such rolls. For this reason the insert must be repeatedly straightened while being run in so that it is not possible to reach even approximately the running-in speeds which are usual and necessary when the sealing is effected without a reinforcing insert. Even if these phenomena could be eliminated, fluttering would occur when a certain unwinding speed is exceeded. This fluttering cannot be readily eliminated. It consists of vibrations which are due to the elasticity of the wire net and which can reach resonant ranges. Displacements in the plane of the net occur so that a straightening of the net is required in this case too. It must also be borne in mind that the wire net must be introduced while under a stress so that the roll core of the net must be braked. This gives also rise to forces which displace the outer net layers in the roll axially with respect to the core of the roll. It has previously been possible to solve these difficulties only in that the running in speed of the wire net was substantially reduced. This leads also to a reduction of the speed with which the paper webs were usually sealed where no reinforcing web was introduced so that the method was rendered uneconomical. This hindered in large-scale introduction of the products of this method, particularly for purposes of pneumatic stowing in mines.

In accordance therewith the invention is based on the object of providing a method of manufacture which does not require a change the previously usual laminating at high working velocities, i.e. the economical manufacture of the starting product on the large machine units developed for this purpose and which involves, on the other hand, no difficulties in transit as are inevitable if webs which are coated only on one side would have to be shipped, and that the reinforcing insert can be introduced at the highest working speeds which are still tolerable in view of the nature of the insert and its behavior during its introduction.

For solving this object, the method proposed of manufacturing webs or sheets of paper, board or the like which are adhesively bonded by sealable binders and reinforced with tension-resisting inserts is characterized according to the invention in that an intermediate product is first made from the webs or sheets by introducing the binder between mutually facing surfaces thereof, whereafter the webs or sheets are unsealed, pulled apart, and are resealed after the reinforcement has been introduced between the same.

The resulting advantages are obvious. The intermediate product suitable for shipment can now be produced in the same economical manner as before. Nevertheless the introduction of the tension-resisting insert can be effected at the highest still admissible speed. The machines suitable for this purpose are simple in construction. For instance, cooling drums are no longer necessary because the reduced speed at which the tension-resisting insert is introduced no longer requires the binder to be withdrawn at the speed rquired during the sealing itself; for this reason an accelerated cooling of the binder is not required.

The webs or sheets of the intermediate product held together by the binder can be heated before and/or while they are being pulled apart. Likewise the webs or sheets may be heated before and/or while they are being reunited. For resealing the webs or sheets it is desirable to use the same binder which had served for the first sealing of the webs or sheets.

The apparatus serving for carrying out the method are suitably characterized in that two pairs of preferably heatable rollers are respectively associated with a supply roller for the intermediate product and with a wind-up roller for the finished product, the first pair of rollers unsealing the webs and the second pair of rollers resealing the same webs after the reinforcement has been introduced.

A particularly important simplification results finally if a plant for manufacturing the reinforcement is structurally combined with the roller stand which consists of the supply and wind-up rollers, the pairs of rollers and the guides for the unsealed webs. Previously it was only possible in the paper processing plant to cause reinforcements obtained from the suppliers to run in between paper webs while heat-sealing the same. As the wire net had already suffered from the previous transit, it was possible to use only relatively low web speeds. According to the invention, however, the lamination of the web may be effected at the usual high web speeds in the paper processing plant. During the performance of these steps the wire net has still the accuracy with which it was manufactured so that the method proposed according to the invention can again be carried out at higher web speeds than were previously practicable where paper webs were reinforced in paper processing plants.

In the drawing:

FIG. 1 shows by way of example the construction of a roller stand for carrying out the method, which stand is structurally combined with a wire net making machine according to Patent 2,813,552 (Ser. No. 269,800) and patent application Ser. No. 569,667, which machine supplies the tension-resisting insert in the form of a welded wire net.

FIG. 2 is a top plan view showing such a wire net.

In the machine, which is only diagrammatically indicated, 1 denotes the base frame of the machine, which is designed at 2 to form a roller stand. The latter has a bearing arrangement 3 for the supply roller 4. The supply roller 4 carries a completely sealed double paper web, which has been manufactured on a machine of appropriate web width, which machine has been designed for this purpose and rotates at very high speed. Such a completely sealed double paper web is shown at 5. This web is introduced into the space between the pair of rollers 6. The double rollers 6 are heated. For this reason it is possible to pull the webs of the double paper web 5 apart and to withdraw the resulting unsealed individual webs 7 and 8 in the direction of arrows 9 and 10. For this purpose, special guide rollers 11 are provided, which are mounted in the roller stand 2. 12 is a second heated pair of rollers. The individual webs 7 and 8 are so guided to this pair of rollers that they include an open angle in which the reinforcement 13 is introduced. As the pair of rollers 12 is heated the binder adhering to the individual webs 7 and 8 becomes again highly adhesive, whether it consists of bitumen, heat sealers or the like, so that the webs 7 and 8 are resealed between the rollers 12 so as to enclose the reinforcement 13. In the resulting end product 14 the webs 7 and 8 are parallel to each other. 15 is the wind-up roller, which is also mounted in the roller stand 2. Only this wind-up roller 15 requires a drive, e.g., by means of the pulley 16 and the belt 17, which is driven by a pulley 18 of the machine for manufacturing the insert. On the wind-up roller 15 a roll 19 of the finished product 14 is built up, which can be removed from the roller stand 2 as soon as it has reached the required size.

The pairs of rollers 6 and 12 are suitably electrically heated. For this purpose each of the rollers 6 and 12 contains an electric heating coil, not shown, the ends of which lead to the electrode rings 34, 35. In slidable engagement with the electrode rings 34, 35 are the contact tongues 31, 32 the ends of which are connected to the heater leads 33.

The machine for manufacturing the insert consists of a wire net making machine according to Patent 2,813,552 (Ser. No. 269,800) and patent application Ser. No. 569,667. The base frame 1 carries also the frame 20 of this wire net making machine. This machine which is shown in detail in the said patents has been only diagrammatically indicated here. The roll carrier 21 for the longitudinal wires 22 of the wire net is apparent, as well as the set 23 of longitudinal wires 22. The supply of transverse wires has not been shown, and also not shown is the device which applies the transverse wire zig-zag on the set of longitudinal wires in accordance with the said patents. The crossings of the net, consisting of the longitudinal and transverse wires, are moved into the range of the periodically moved raillike welding electrode 24 and of the counterelectrode 25 so that the crossings are welded in rows. The complete welded wire net 13 is withdrawn over the devices 26, 27 and thus introduced between the webs 7, 8 at 12.

FIG. 2 shows the wire net made on the wire net making machine according to FIG. 1. It is apparent that the longitudinal wires 23 are crossed by the transverse wires at 30. It is also apparent from FIG. 2 that each transverse wire 28 lying above the longitudinal wires 23 is followed by a transverse wire 29 lying below the longitudinal wires 23. Alternatively, two transverse wires 28 lying above the longitudinal wires 23 could be followed by two transverse wires 29 lying below the longitudinal wires 23. Or groups of three, four, five, six etc. successive transverse wires 28 could be followed by three, four, five, six etc. transverse wires 29. This alternation of the transverse wires 28, 29 above and below the longitudinal wires 23 is of advantage because the individual webs 7, 8 will then run in between the rollers 12 at equal speed and will not be displaced relative to each other.

If only transverse wires 28 or only transverse wires 29 were used, one of the webs 7, 8 would run in at a higher speed than the other web causing disturbances in the manufacture of the resealed web 14. A wire net making machine according to the said patents facilitates the alternating arrangement of transverse wires 28, 29 above and below the longitudinal wires 23 because the reciprocating transverse wire feeder need only be bevelled in opposite directions at its ends to enable it to be moved above and below the longitudinal wires 23.

Where sealable cold adhesives are used as binders it is not necessary to provide heating means for the pairs of rollers 6 and 12. In most cases, however, bitumens are used as binders because they are satisfactory for the purposes involved and more economical. Such bitumens harden in the cold and become soft when heated. For this reason the pairs of rollers 6 and 12 must be heated where these bitumens are used.

It is in the nature of the invention that it is not restricted to the use in resealing the webs or sheets with inclusion of the reinforcement only the binder which had served for the first uniting of the webs or sheets. It is also possible to use additional or different binders. Nor is it precluded to introduce simultaneously several substances, if desired in the form of webs, tapes or sheets, during resealing. For instance, the outside surfaces of the final product facing away from each other may be dusted with talc, soapstone or other substances in order to facilitate the unwinding of the rolls formed by the end product.

What is claimed is:

1. In a method for producing a composite reinforced web comprising the steps of sealing a pair of flexible webs together by feeding a sealable binder between opposite faces of said webs so as to distribute by said sealing said sealable binder over said opposite faces of said webs and to adhere said webs to each other; pulling said adhering webs with said binder distributed therebetween apart from each other so as to expose said opposite faces of said webs with sealable binder distributed over each of said opposite faces; feeding a reinforcement between said opposite faces of said webs having said sealable binder distributed over each of said faces; and resealing said flexible webs by means of said previously applied sealable binder distributed over said opposite faces thereof and with said reinforcement sandwiched therebetween so as to obtain a composite reinforced web consisting of two outer superimposed flexible webs with said reinforcement firmly held between said superimposed flexible webs by said sealable binder distributed over said opposing faces of said superimposed flexible webs.

2. A method as set forth in claim 1 in which said reinforcement consists of a netting.

3. A method as set forth in claim 2 in which said netting consists of a wire netting.

4. A method as set forth in claim 3 and including the step of producing said wire netting at a location adjacent the location where said adhering webs are pulled apart and in which said wire netting is right after production directly fed in between said opposite faces of the pulled-apart webs.

5. A method as set forth in claim 1 in which said flexible webs are paper webs.

6. A method as set forth in claim 1 in which said sealable binder consists of bitumen.

7. A method as set forth in claim 1 and including the step of heating said webs during pulling apart thereof.

8. A method as set forth in claim 1 and including the step of heating said flexible webs and therewith the binder applied thereto during resealing of said webs.

9. A method as set forth in claim 1 including the step of heating the reinforcement during the feeding thereof between said opposite faces of said webs.

10. In a method for producing a composite reinforced web comprising the steps of sealing a pair of flexible webs together in a first operation by feeding a sealable binder between opposite faces of said webs so as to distribute by said sealing said sealable binder over said opposite faces of said webs and to adhere said webs to each other to thus obtain an intermediate product; and using said intermediate product in a second operation independent from the first operation and comprising the steps of pulling said adhering webs with said binder distributed therebetween apart from each other so as to expose said opposite faces of said webs with sealable binder distributed over each of said opposite faces, feeding a reinforcement between said opposite faces of said webs having said sealable binder distributed over each of said faces, and resealing said flexible webs by means of said previously applied sealable binder distributed over said opposite faces thereof and with said reinforcement sandwiched therebetween so as to obtain a composite reinforced web consisting of two outer superimposed flexible webs with said reinforcement firmly held between said superimposed flexible webs by said sealable binder distributed over said opposing faces of said superimposed flexible webs.

11. A method as set forth in claim 10 in which said first operation is carried out at greater speed than said second operation.

12. A machine for manufacturing composite reinforced webs comprising, in combination, support means; a supply roll for an intermediate product comprising a pair of webs sealed together by a binder applied to facing surfaces of said webs, said supply roll being turnably mounted on said support means; a take-up roll turnably mounted on said support means spaced from said supply roll for receiving the composite reinforced web; first roller means between said supply roll and said take-up roll for first deflecting the individual webs of said intermediate product in different directions and for then feeding said webs toward each other, said first roller means comprising a plurality of rollers turnably mounted on said support and all of which engaging said individual webs only on surfaces opposite to said surfaces carrying the binder; feeding means for feeding a reinforcing netting between said surfaces of said approaching webs carrying said binder; and second roller means for pressing said surfaces of said webs carrying the binder with said reinforcing web located therebetween together to thus form a composite reinforced web, said second roller means comprising a pair of closely spaced rollers mounted on said support means turnably about parallel axes between said first roller means and said take-up roll.

13. A machine as set forth in claim 12, said machine comprising further means for heating the intermediate product in the region of the one roller of said plurality of rollers of said first roller means which follows said supply roll in feeding direction of the web.

14. A machine as set forth in claim 12, said machine comprising further means for heating the intermediate product, said means constructed as heaters, said heaters arranged in at least one roller of said first roller means.

15. A machine as set forth in claim 12, said machine comprising further means for heating at least the individual webs in the region of said second roller means.

16. A machine as set forth in claim 12, said machine comprising further means for heating at least the individual webs, said means consisting of heaters, said heaters being disposed in at least one roller of said second roller means.

17. A machine for manufacturing composite reinforced webs comprising, in combination, support means; a supply roll for an intermediate product comprising a pair of webs sealed together by a binder applied to facing surfaces of said webs, said supply roll being turnably mounted on said support means; a take-up roll turnably mounted on said support means spaced from said supply roll for receiving the composite reinforced web; first roller means between said supply roll and said take-up roll for first deflecting the individual webs of said intermediate product in different directions and for then feeding said webs toward each other, said first roller means comprising a plurality of rollers turnably mounted on said support and all of which engaging said individual webs only on surfaces opposite to said surfaces carrying the binder; reinforcing net producing means adjacent said support means; feeding means for feeding said reinforcing net directly from said producing means between said surfaces of said approaching webs carrying said binder; and second roller means for pressing said surfaces of said webs carrying the binder with said reinforcing net located there-between together to thus form a composite reinforced web, said second roller means comprising a pair of closely spaced rollers mounted on said support means turnably about parallel axes between said first roller means and said take-up roll.

References Cited by the Examiner
UNITED STATES PATENTS

| | | | |
|---|---|---|---|
| 1,201,756 | 10/1916 | Perry | 154—51 |
| 1,311,491 | 7/1919 | Briggs | 154—37 XR |
| 1,882,715 | 10/1932 | Angier | 156—152 |
| 2,742,391 | 4/1956 | Warp | 154—127 |
| 2,954,816 | 10/1960 | Havemann | 156—177 |
| 3,068,135 | 12/1962 | Bower | 156—179 |

EARL M. BERGERT, *Primary Examiner.*

CARL F. KRAFFT, *Examiner.*